(12) United States Patent
Ungchusri et al.

(10) Patent No.: US 10,100,959 B2
(45) Date of Patent: Oct. 16, 2018

(54) SWIVEL JOINT FOR OILFIELD PUMPING STIMULATION

(71) Applicant: FMC Technologies, Inc., Houston, TX (US)

(72) Inventors: Tep Ungchusri, Conroe, TX (US); William H. Garner, Houston, TX (US); Monty W. Champion, Stephenville, TX (US); Tommy Thammavongsa, Houston, TX (US)

(73) Assignee: FMC Technologies, Inc., Houston, TX (US)

( * ) Notice: Subject to any disclaimer, the term of this patent is extended or adjusted under 35 U.S.C. 154(b) by 594 days.

(21) Appl. No.: 14/555,995

(22) Filed: Nov. 28, 2014

(65) Prior Publication Data
US 2016/0153596 A1 Jun. 2, 2016

(51) Int. Cl.
*F16L 27/00* (2006.01)
*F16L 27/08* (2006.01)
(Continued)

(52) U.S. Cl.
CPC .......... *F16L 27/0828* (2013.01); *E21B 17/05* (2013.01); *E21B 21/02* (2013.01);
(Continued)

(58) Field of Classification Search
USPC ............... 285/98, 121.6, 272, 275, 276, 351
See application file for complete search history.

(56) References Cited

U.S. PATENT DOCUMENTS

| 2,382,375 | A | * | 8/1945 | Allen | F16L 27/0828 |
| | | | | | 285/110 |
| 2,412,287 | A | * | 12/1946 | Phillips | B65H 75/4478 |
| | | | | | 285/112 |
| 2,511,386 | A | * | 6/1950 | Warren | F16L 27/0828 |
| | | | | | 277/553 |
| 3,884,511 | A | * | 5/1975 | Hermanson | F16L 27/0828 |
| | | | | | 285/276 |

(Continued)

*Primary Examiner* — Aaron M Dunwoody
(74) *Attorney, Agent, or Firm* — Henry C. Query, Jr.

(57) ABSTRACT

A swivel joint comprises a tubular female member which is rotatably connected to a tubular male member. The female member includes a female race portion having an axially extending inner annular recess, a female inner end portion which is formed at an axially inner end of the recess, and a number of inner annular grooves which are formed in the recess coaxially therewith. The male member includes a male race portion having an annular outer surface which is configured to be received in the recess, a male nose portion which is formed at an end of the male race portion, and a number of outer annular grooves which are formed on the outer surface coaxially therewith. The male race portion is positioned in the female race portion such that the male nose portion is located adjacent the female inner end portion and each outer groove is aligned with a corresponding inner groove to thereby define a number of annular bearing races within which a plurality of balls are received to thereby rotatably connect the male member to the female member. The swivel joint includes a first primary seal which is positioned between the male nose portion and the female inner end portion, and a second primary seal which is positioned between the male nose portion and the female inner end portion radially outwardly of the first primary seal. The male and female members define a flow bore through the swivel joint which is sealed by the first primary seal and, in the event of a failure of the first primary seal, the second primary seal.

18 Claims, 5 Drawing Sheets

(51) Int. Cl.
| | |
|---|---|
| *E21B 17/05* | (2006.01) |
| *F16L 21/03* | (2006.01) |
| *E21B 43/26* | (2006.01) |
| *E21B 21/02* | (2006.01) |
| *F16J 15/12* | (2006.01) |
| *F16J 15/16* | (2006.01) |

(52) U.S. Cl.
CPC ............ *E21B 43/26* (2013.01); *F16J 15/121* (2013.01); *F16J 15/166* (2013.01); *F16L 21/03* (2013.01); *F16L 2201/30* (2013.01)

(56) References Cited

U.S. PATENT DOCUMENTS

| | | | | |
|---|---|---|---|---|
| 4,234,216 | A * | 11/1980 | Swanson | F16L 27/0828 285/276 |
| 4,355,827 | A * | 10/1982 | Ehret | F16J 15/164 277/377 |
| 4,431,217 | A * | 2/1984 | Witt | F16J 15/065 285/108 |
| 4,626,003 | A * | 12/1986 | Williams | F16L 27/0828 277/361 |
| 4,695,078 | A | 9/1987 | Anderson | |
| 5,149,148 | A | 9/1992 | Taeuber, Jr. et al. | |
| 6,371,527 | B1 | 4/2002 | Ungchusri et al. | |
| 6,595,555 | B2 * | 7/2003 | Ungchusri | F16L 27/0828 285/276 |
| 8,783,733 | B2 | 7/2014 | Tausch | |
| 2009/0008934 | A1 * | 1/2009 | Matzner | F16C 19/08 285/276 |

* cited by examiner

SWIVEL JOINT FOR OILFIELD PUMPING STIMULATION

The present invention is directed to swivel joint. More particularly, the invention is directed to a swivel joint which includes both first and second primary seals between the male and female portions of the swivel joint to increase the useful life of the swivel joint.

BACKGROUND OF THE INVENTION

Swivel joints are commonly used in the oilfield industry to build rigid yet dynamically configurable flow lines between various pieces of equipment. For example, in oilfield pumping stimulation operations, or fracking operations, swivel joints are often used to connect a number of high pressure pumping units to a manifold and to connect the manifold to an injection wellhead.

These types of swivel joints typically comprise a tubular male member which is rotatably connected to a tubular female member. The male member comprises a male race and the female member comprises a female race which is configured to be receive the male race. When the male race is positioned in the female race, each of a plurality of outer annular grooves on the male race is aligned with a corresponding inner annular groove on the female race to thereby form plurality of bearing races within which a plurality of balls are received to rotatably connect the male member to the female member.

When the male and female members are connected together, an annul is formed between the male and female races which is in fluid communication with the flow bore defined by the swivel joint. In order to contain the fracking fluid within the flow bore while still allowing the male and female members to rotate relative to each other, the swivel joint usually includes a dynamic primary seal which is positioned between a nose portion of the male race and an inner end portion of the female race.

However, if the primary seal fails, the flow of pressurized fracking fluid through the annulus can quickly erode the male nose portion and/or the female inner end portion and thereby cause the swivel joint to fail. Also, pressurized fluid will enter the annulus and generate hydrostatic end loads between the male and female races which could cause the bearing races to fail.

SUMMARY OF THE INVENTION

In accordance with the present invention, these and other limitations in the prior art are addressed by providing a swivel joint which includes a tubular female member that is rotatably connected to a tubular male member. The female member includes a female race portion having an axially extending inner annular recess, a female inner end portion which is formed at an axially inner end of the recess, and a number of inner annular grooves which are formed in the recess coaxially therewith. The male member includes a male race portion having an annular outer surface which is configured to be received in the recess, a male nose portion which is formed at an end of the male race portion, and a number of outer annular grooves which are formed on the outer surface coaxially therewith. The male race portion is positioned in the female race portion such that the male nose portion is located adjacent the female inner end portion and each outer groove is aligned with a corresponding inner groove to thereby define a number of annular bearing races within which a plurality of balls are received to thereby rotatably connect the male member to the female member. The swivel joint further includes a first primary seal which is positioned between the male nose portion and the female inner end portion, and a second primary seal which is positioned between the male nose portion and the female inner end portion radially outwardly of the first primary seal. Thus, the male and female members define a flow bore through the swivel joint which is sealed by the first primary seal and, in the event of a failure of the first primary seal, the second primary seal.

In accordance with one embodiment of the invention, the second primary seal is mounted in an annular seal pocket which is formed in the female inner end portion. The second primary seal may comprise in cross section a generally rectangular base portion which is positioned at least partially in the seal pocket and an annular ridge portion which extends radially inwardly from the base portion and sealingly engages the male nose portion. The annular ridge portion may comprise in cross section a radially inner peak and a beveled portion which diverges radially outwardly from the peak in a direction toward an axially outer end of the recess. In this embodiment, the beveled portion sealingly engages a conical sealing surface which is formed on the male nose portion opposite the seal pocket, and the peak sealingly engages a cylindrical sealing surface which is formed on the male nose portion axially inwardly of the conical sealing surface. Also, the second primary seal may comprise an annular non-extrusion spring which is located proximate an intersection of the base portion and the beveled portion.

In accordance with another embodiment of the invention, the male nose portion comprises an end wall which extends radially outwardly from the flow bore and a cylindrical side wall which extends axially outwardly from the end wall, and the first primary seal sealing engages the end wall and the second primary seal sealingly engages the cylindrical side wall. The male nose portion may also comprise a conical side wall which diverges radially outwardly from the cylindrical side wall in a direction toward the axially outer end of the recess. In this case, the second primary seal sealingly engages both the cylindrical side wall and the conical side wall. In this embodiment, the second primary seal may comprise in cross section a radially inner peak and a beveled portion which diverges radially outwardly from the peak in a direction toward an axially outer end of the recess, in which event the annular peak sealingly engages the cylindrical side wall and the beveled portion sealingly engages the conical side wall.

In accordance with a further embodiment of the invention, the second primary seal comprises a generally rectangular cross section having a first axially outer sealing face which sealingly engages a radially extending first end wall on the male nose portion. In this embodiment, the first primary seal may be mounted in an annular seal pocket which is formed in the female inner end portion, in which event the first primary seal comprises a generally rectangular cross section having a second axially outer sealing face which sealingly engages a radially extending second end wall that is formed on the male nose portion radially and axially inwardly of the first end wall. Moreover, the second end wall may extend radially outwardly from the flow bore and be connected to the first end wall by an axially extending cylindrical side wall.

In accordance with still another embodiment of the invention, the swivel joint includes an annulus which is formed between the female inner end portion and the male nose portion and is connected to the flow bore. The annulus comprises a portion which extends between the second primary seal and an axially innermost bearing race, and the swivel joint further includes a leak detection port which extends through the female member to the annulus portion. In this manner, a failure of both the first and second primary seals can be detected by observing whether fluid from the flow bore is escaping through the leak detection port.

In accordance with another embodiment of the invention, the swivel joint includes a monitor port which extends through the female member to a portion of the annulus that extends between the first and second primary seals. The monitor port is sealed by a removable plug, and a failure of the first primary seal can be detected by removing the plug and determining whether fluid from the flow bore has entered the monitor port.

In accordance with still another embodiment of the invention, the swivel joint includes a monitor port which extends through the female member to a portion of the annulus that extends between the first and second primary seals, a plug member which is positioned in the monitor port, and a plug holder which is positioned in the monitor port radially outwardly of the plug member and comprises an axial through bore. The plug is configured such that, in the event of a failure of the first primary seal, pressure in the annulus portion will force at least a portion of the plug through the axial through bore to thereby provide a visual indication that the first primary seal has faded. The swivel joint may further comprise a retainer which is secured in the monitor port radially outwardly of the plug holder to thereby secure the plug holder in the monitor port, and a keeper which is positioned in the monitor port between the plug holder and the retainer. In this embodiment, the keeper comprises a cavity on its radially inner end which is aligned with the through bore and into which the portion of the plug will extrude in the event of a failure of the first primary seal. Also, an annular portion of the plug holder surrounding the through bore may be sealed to the monitor port and a radially inner end of the keeper may be sealed to a radially outer end of the plug holder over the through bore to thereby retain the pressure in the monitor port.

Thus, the second primary seal provides an effective means for extending the useful life of the swivel joint. Should the first primary seal fail, the second primary seal will prevent high pressure fracking fluid from flowing through the annulus at a rate which would otherwise cause the male nose portion and/or the female inner end portion to wash out. As a result, if the first primary seal fails, the useful life of the swivel joint can be extended by simply replacing the first primary seal. Also, with the second primary seal in place, a failure of the first primary seal does not result in a total rupture of the seal. Rather, the first primary seal will act as a labyrinth seal and restrict the flow of solid fracking materials to the second primary seal. Therefore, a failure of the first primary seal will not result in erosion of the sealing surfaces.

Furthermore, since the cylindrical sealing surface is radially proximate the end wall against which the first primary seal is sealingly engaged, a failure of the first primary seal will result in manageable increases in the hydrostatic end loads on the male and female race portions. Moreover, since the conical sealing surface extends radially outwardly from the cylindrical sealing surface, the radial cross section of the male nose portion remains substantial, thus making the swivel joint suitable for erosive applications. Additionally, since the annular peak of the second primary seal is located both radially and axially inwardly of the beveled portion of the seal, pressure in the annulus will force the annular ridge portion into tighter sealing engagement with the conical sealing surface in a manner similar to a pressure energized seal. Therefore, the second primary seal will provide an effective seal which will allow the swivel joint to remain in service until the first primary seal can be replaced.

These and other objects and advantages of the present invention will now be described with reference to the accompanying drawings. In the drawings, the same reference numbers may be used to denote similar components in the various embodiments.

BRIEF DESCRIPTION OF THE DRAWINGS

FIG. 4 is an enlarged cross sectional view of the primary swivel joint seal shown in FIG. 3;

DETAILED DESCRIPTION OF THE INVENTION

Figure 1:
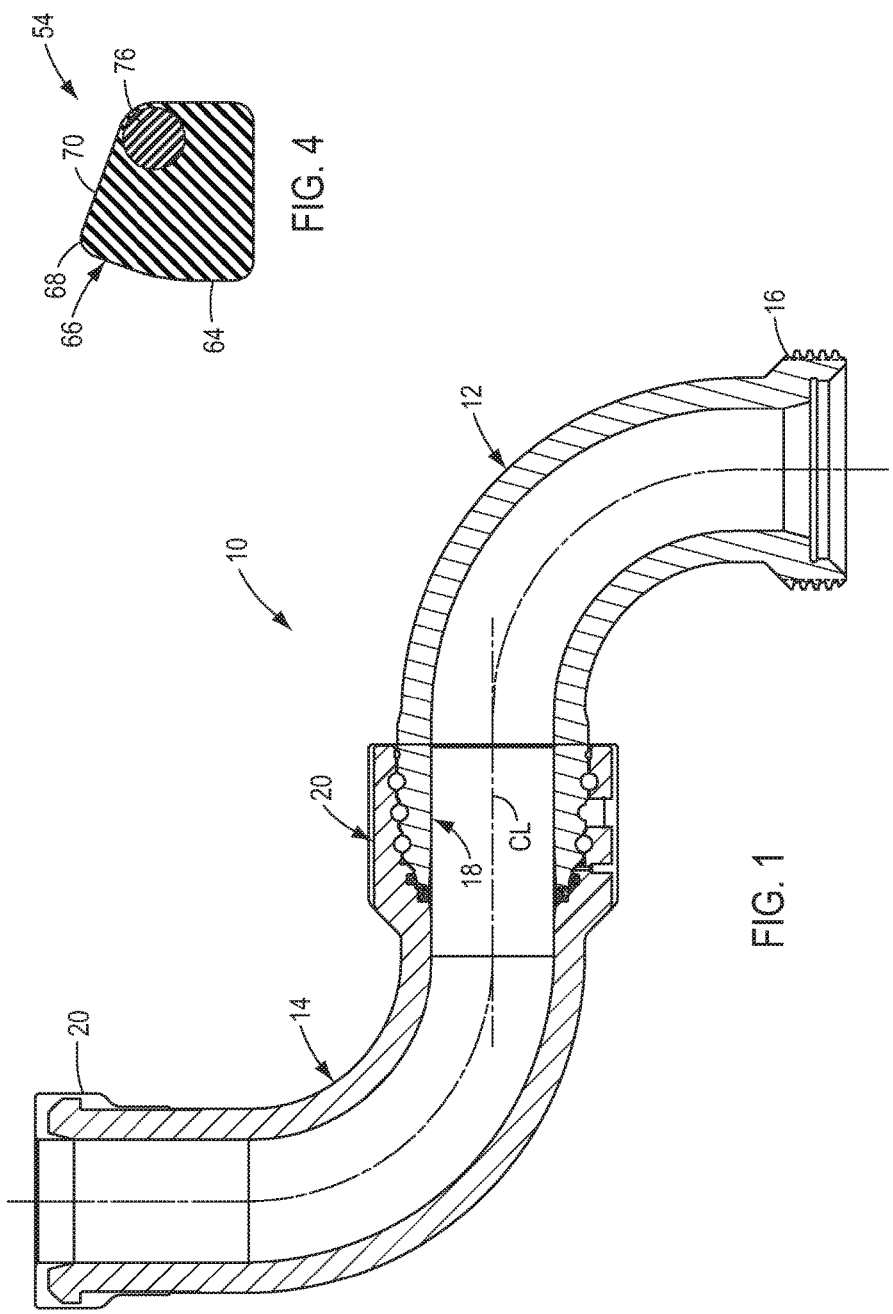
FIG. 1 is a cross sectional view of a first embodiment of the swivel joint of the present invention.

A first embodiment of the swivel joint of the present invention is shown in FIG. 1. The swivel joint of this embodiment, generally 10, includes a tubular male member 12 which is rotatably connected to a tubular female member 14 to thereby form a fluid pipe component that can be connected to other pipe components (not shown) in a known manner to build a configurable flow line which can be used to connect, e.g., a pumping unit to an injection wellhead for use in well tracking operations. Although the male and female members 12, 14 are depicted as being L-shaped, they can have any conventional configuration. For example, one or both of the male and female members 12, 14 may be straight.

The male member 12 includes a first end 16 which is connectable to another pipe component and a second end which is configured as a male race portion 18. Similarly, the female member 14 includes a first end 20 which is connectable to another pipe component and a second end which is configured as a female race portion 22. The male and female race portions 18, 22 comprise a common axial centerline CL and are connected together (as ill be described below) such that the male and female members 12, 14 are rotatable relative to each other about the centerline CL.

Figure 2:
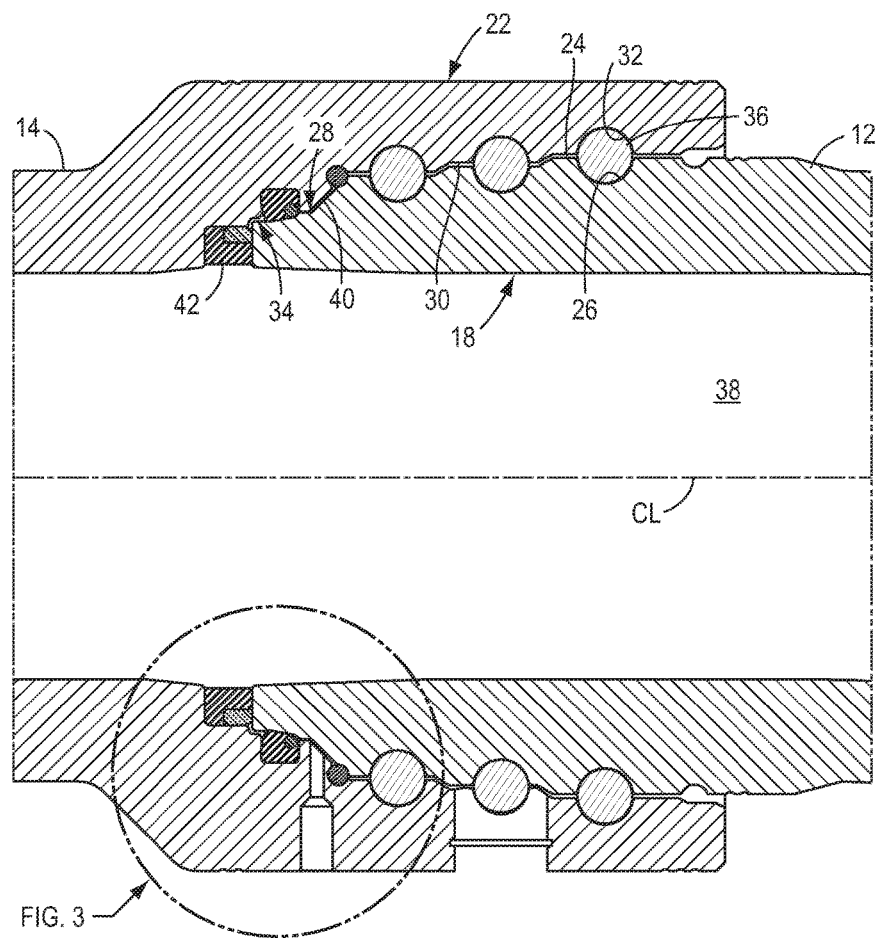
FIG. 2 is an enlarged cross sectional view of the male and female race portions of the swivel joint of FIG. 1.

Referring also to FIG. 2, the male race portion 18 comprises an annular outer surface 24, a number (in this case three) of outer annular grooves 26 which are formed on the outer surface coaxially with the centerline CL, and a male nose portion 28 which is formed at the end of the male member 12. The female race portion 22 includes an axially extending inner annular recess 30 which is configured to receive the outer surface 24 of the male race portion 18, a number (in this case three) of inner annular grooves 32 which are formed in the recess coaxially with the centerline CL, and a female inner end portion 34 which is formed at an axially inner end of the recess. As used herein, the terms "axially inner" and "axially outer" are referenced to the recess 30. Thus, the term "axially inner" refers to innermost end of the recess 30, which is the left end of the recess as viewed in FIG. 2, and the term "axially outer" refers to the end of the recess which coincides with the end of the female member 14.

As shown in FIG. 2, when the male race portion 18 is positioned in the recess 30, the male nose portion 28 is located adjacent the female inner end portion 34. In this position, each of the outer annular grooves 26 is aligned with a corresponding inner annular groove 32 to thereby form an equal number of bearing races within which a plurality of balls 36 are received to thereby rotatably connect the male member 12 to the female member 14. When so connected, the male and female members 12, 14 define a continuous flow bore 38 through the swivel joint 10.

Figure 3:
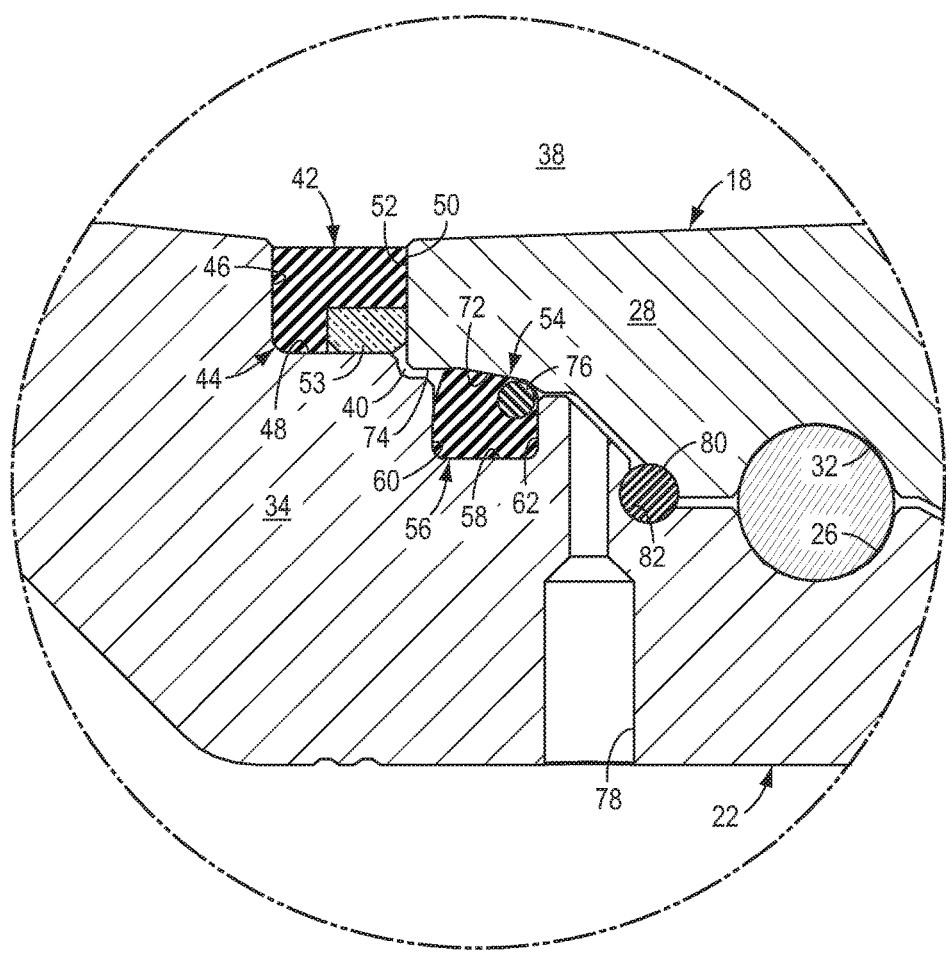
FIG. 3 is an enlarged cross sectional view of a portion of the male and female race portions shown in FIG. 2.

When the male and female members 12, 14 are connected as just described, an annulus 40 is formed between the male and female race portions 18, 22. In order to contain the pressure within the flow bore 38 while still allowing the male and female members 12, 14 to rotate relative to each other, the swivel joint 10 is provided with a dynamic first primary seal 42 which is positioned between the male nose portion 28 and the female inner end portion 34. Referring also to FIG. 3, the first primary seal 42 is mounted in a first seal pocket 44 which is formed in the female inner end portion 34. The first seal pocket 44 may comprise, for example, a first end wall 46 which extends radially outwardly from the flow bore 38 and a cylindrical first sidewall 48 which extends axially outwardly from the first end wall. In this example, the first primary seal 42 comprises a generally rectangular cross section having an axially outer sealing face 50 that engages a radially extending second end wall 52 on the male nose portion 28. The first primary seal 42 may also include a non-extrusion ring 53 which is positioned adjacent the annulus 40.

Should the primary seal 42 fail, the flow of pressurized fracking fluid through the annulus 40 can quickly erode the male nose portion 28 and/or the female inner end portion 34 and thereby cause the swivel joint 10 to fail. In accordance with the present invention, this problem is addressed by providing the swivel joint 10 with a dynamic second primary seal 54 between the male nose portion 28 and the female inner end portion 34 radially outwardly of the first primary seal 42. In this regard, a "primary seal" is one which is capable of sealing against the line pressure for which the swivel joint is rated. For example, if the swivel joint is designed to handle a pressure of 15,000 psi, the primary seal must be capable of sealing against this pressure.

In the event of a failure of the primary seal 42, pressurized fluid will enter the annulus 40 and generate hydrostatic end loads between the male nose portion 28 and the female inner end portion 34 which could cause the male and/or female race portions 18, 22 to fail. In order to minimize these hydrostatic end loads, the second primary seal 54 should be positioned as close to the flow bore 38 as possible. However, if the second primary seal 54 is positioned too close to the flow bore, the radial cross section of the male nose portion 28 may be too thin for highly erosive applications.

In accordance with the present invention, therefore, the swivel joint 10 is configured such that the second primary seal 54 seals against the male nose portion 28 only slightly radially outwardly of the end wall 52 against which the first primary seal 42 seals. In addition, the second primary seal 54 is mounted in a seal pocket which is ideally located in the female inner end portion 34 rather than the male nose portion 28. In this manner, should the first primary seal 42 fail, the second primary seal 54 will contain the pressure relatively close to the flow bore 38, which will accordingly minimize the hydrostatic end loads between the male nose portion 28 and the female inner end portion 34 that could otherwise cause the male and/or female race portions 18, 22 to fail. Also, since the seal pocket for the second primary seal 54 is located in the female inner end portion 34, the seal pocket does not reduce the radial cross section of the male nose portion 28 and the swivel joint 10 will consequently be better able to withstand highly erosive fluids.

As shown in FIG. 3, the second primary seal 54 is mounted in a second seal pocket 56 which is formed in the female inner end portion 34 both radially and axially outwardly of the first primary seal 42. The second seal pocket 56 comprises a generally rectangular cross section which includes an axially extending floor 58 and two radially extending, axially inner and outer side walls 60, 62.

Referring also to FIG. 4, the second primary seal 54 comprises in cross section a generally rectangular base portion 64 which is positioned at least partially in the second seal pocket 56 and an annular ridge portion 66 which extends radially inwardly from the base portion and sealingly engages the male nose portion 28. Specifically, the annular ridge portion 66 may comprise in cross section a radially inner peak 68 and a beveled portion 70 which diverges radially outwardly from the peak. In this embodiment, the beveled portion 70 sealingly engages a conical side wall or sealing surface 72 which is formed on the male nose portion 28 opposite the second seal pocket 56 and the annular peak 68 sealingly engages a cylindrical side wall or sealing surface 74 which is formed on the male nose portion axially inwardly of the conical sealing surface. An advantage of mounting the second primary seal 54 in the female inner end portion 34 and locating the sealing surfaces 72, 74 on the male nose portion 28 is that these sealing surface are readily accessible prior to assembly of the swivel joint 10 and can therefore be easily machined, polished and inspected.

Thus, the second primary seal 54 provides a particularly effective means for extending the useful life of the swivel joint 10. Should the first primary seal 42 fail, the second primary seal 54 will prevent the high pressure tracking fluid from flowing through the annulus 40 at a rate which would otherwise cause the male nose portion 28 and/or the female inner end portion 34, and in particular the second end wall 52 against which the first primary seal 42 normally seals, to rapidly erode or "wash out". As a result, if the first primary seal 42 fails, the useful life of the swivel joint 10 can be extended by simply replacing the first primary seal. Also, the inventors have discovered that, with the second primary seal 54 in place, a failure of the first primary seal 42 does not result in a total rupture of the seal. Rather, the first primary seal 42 will act as a labyrinth seal that will restrict the flow of solid fracking materials to the second primary seal 54. Therefore, a failure of the first primary seal 42 will not result in erosion of the sealing surfaces 72, 74.

Furthermore, since the cylindrical sealing surface 74 is radially proximate the end wall 52 against which the first primary seal 42 is engaged, a failure of the first primary seal will result in manageable increases in the hydrostatic end loads on the male and female race portions 18, 22. Moreover, since the conical sealing surface 72 extends radially outwardly from the cylindrical sealing surface 74, the radial cross section of the male nose portion 28 remains substantial, thus making the swivel joint 10 suitable for erosive applications. Additionally, since the annular peak 68 of the second primary seal 54 is located both radially and axially inwardly of the beveled portion 70 of the seal, pressure in the annulus 40 will force the annular ridge portion 66 into tighter sealing engagement with the conical sealing surface 72 in a manner similar to a pressure energized seal. Therefore, the second primary seal 54 will provide an effective seal which will allow the swivel joint 10 to remain in service until the first primary seal 42 can be replaced.

Although not required, the second primary seal 54 may also comprise an annular non-extrusion spring 76 which is molded into the seal proximate an intersection of the base portion 64 and the beveled portion 70, which as shown in FIG. 3 is adjacent the annulus 40 between the male nose portion 28 and the female inner end portion 34. Accordingly, the non-extrusion spring 76 will minimize the likelihood that the second primary seal 54 will extrude into the annulus 40 should the first primary seal 42 fail.

Referring still to FIG. 3, the swivel joint may comprise an optional leak detection port 78 which extends through the female race portion 22 to a portion of the annulus 40 located between the second primary seal 54 and the axially innermost bearing race defined by the inner and outer annular grooves 26, 32. This portion of the annulus 40 is preferably isolated from the axially innermost bearing race by a leak detection seal 80, such as an O-ring, which is positioned in an annular seal groove 82 in the female inner end portion 34. As shown in FIG. 3, the seal groove 82 may comprise a circular cross section which conforms to the cross section of the seal 80 in order to securely retain the seal in position against pressure in the annulus 40 should both the first and second primary seals 42, 54 fail. In the event of a failure of both of these seals, tracking fluid in the flow bore 38 will flow through the annulus 40 and the leak detection port 78 and out to the atmosphere. Consequently, pressure will not be allowed to build up in the annulus 40 and the seal 80 will prevent sand and fracking fluid from entering the bearing races.

Figure 5:
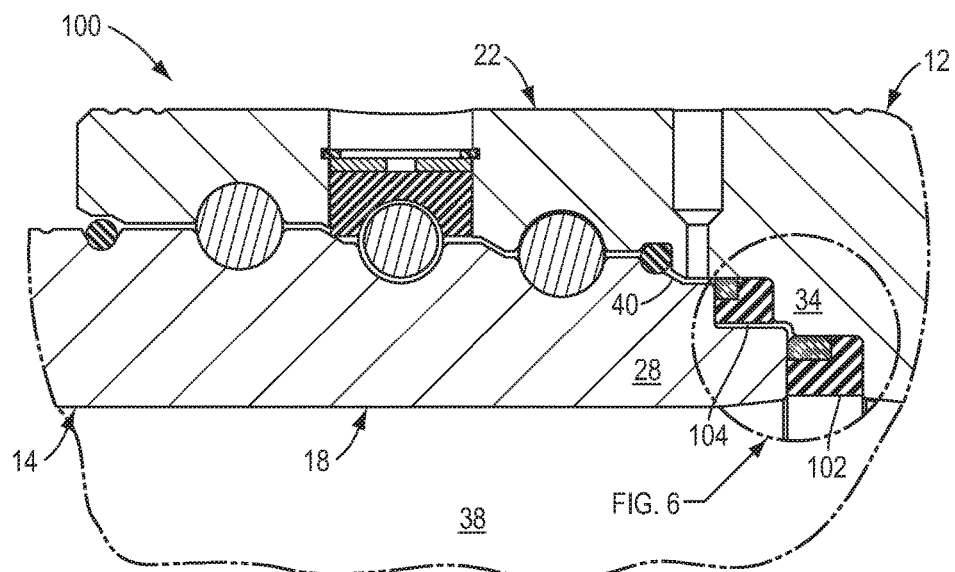
FIG. 5 is an enlarged cross sectional view of the male and female race portions of a second embodiment of the swivel joint of the present invention.

Another embodiment of the swivel joint of the present invention is shown in FIG. 5. The swivel joint of this embodiment, generally 100, is similar in many respects to the swivel joint 10 described above. Therefore, only the male and female race portions 18, 22 are depicted in FIG. 5, and only those portions of the swivel joint 100 which differ from the swivel joint 10 will be described. As with the swivel joint 10, the swivel joint 100 includes a dynamic first primary seal 102 which is mounted between the male nose portion 28 and the female inner end portion 34 and a dynamic second primary seal 104 which is mounted between the male nose portion and the female inner end portion radially outwardly of the first primary seal.

Figure 6:
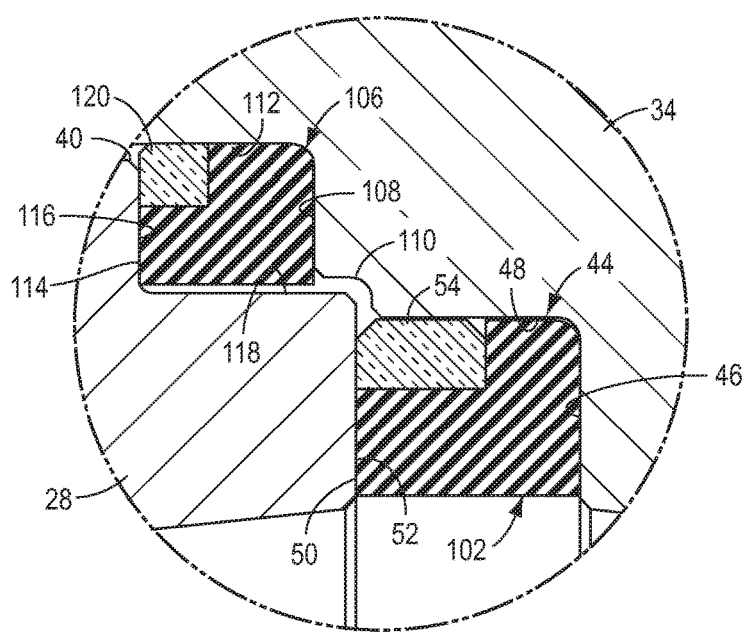
FIG. 6 is an enlarged cross sectional view of the first and second primary seals used in the swivel joint of FIG. 5.

Referring also to FIG. 6, the first primary seal 102 is similar to the first primary seal 42 discussed above. Accordingly, the first primary seal 102 is mounted in a first seal pocket 44 which is formed in the female inner end portion 34. The first seal pocket 44 includes a first end wall 46 which extends radially outwardly from the flow bore 38 and a cylindrical first sidewall 48 that extends axially outwardly from the first end wall. As the first primary seal 42, the first primary seal 102 comprises a generally rectangular cross section having an axially outer sealing face 50 that sealingly engages a radially extending second end wall 52 on the male nose portion 28 to thereby seal the annulus 40 from the flow bore 38. The first primary seal 102 may also include a non-extrusion ring 54 which is positioned adjacent the annulus 40.

In accordance with the present embodiment, the second primary seal 104 is similar in configuration to the first primary seal 102 and is mounted in a second seal pocket 106 which is formed in the female inner end portion 34. The second seal pocket 106 includes a third end wall 108 which, after an optional step 110 to accommodate the male nose portion 28, extends radially outwardly from the cylindrical first sidewall 48, and a cylindrical second sidewall 112 which extends axially outwardly from the third end wall. As with the first primary seal 102, the second primary seal 104 comprises a generally rectangular cross section having an axially outer sealing face 114 that sealingly engages a radially extending fourth end wall 116. The fourth end wall 116 is formed on the male nose portion 28 radially and axially outwardly of the second end wall 52, and in this case the fourth end wall is connected to the second end wall by a third cylindrical side wall 118. The first primary seal 102 may also include a non-extrusion ring 120 which is positioned adjacent the annulus 40.

In comparison to the second primary seal 54 of the swivel joint 10, the second primary seal 104 seals against the male nose portion 28 at a slightly larger radius. Thus, in the event of a failure of the first primary seal 102, the hydrostatic end loads generated between the male and female race portions 18, 22 will be somewhat greater than those experienced in the swivel joint 10. Nevertheless, the second primary seal 104 will prevent wash out the male nose portion 28 and/or the female inner end portion 34 and substantially increase the useful life of the swivel joint 100. Also, since the second seal pocket 106 is formed in the female inner end portion 34, the radial cross section of the male nose portion 28 can be designed sufficiently large to make the swivel joint 100 suitable for erosive applications.

In accordance with a further embodiment of the invention, the swivel joint may include means for monitoring the condition of the first primary seal. Some examples of such monitoring means will now be described in the context of the swivel joint 100 discussed above, it being understood that the monitoring means can be incorporated into the swivel joint 10 in a similar manner.

Figure 7:
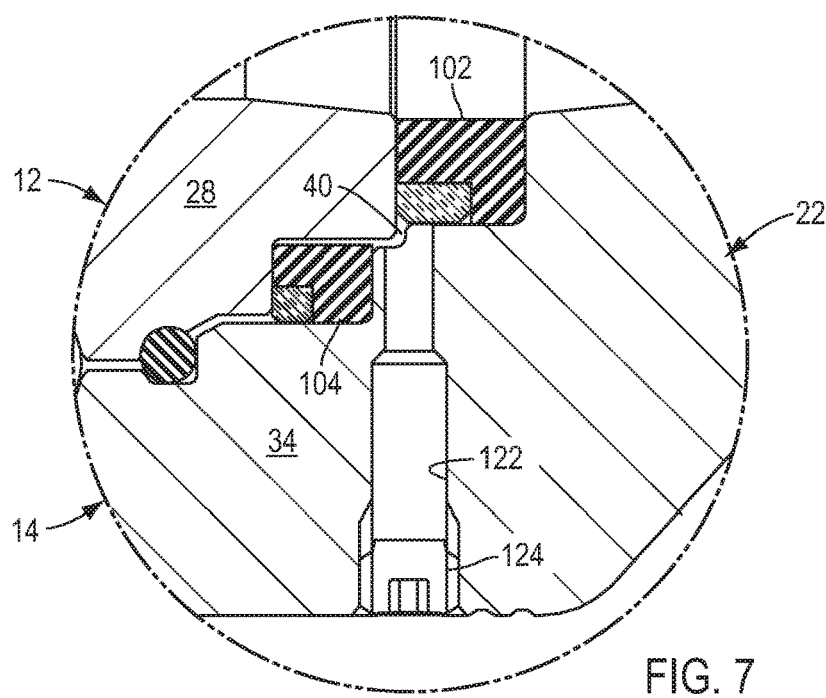
FIG. 7 is an enlarged cross sectional view of the male and female race portions of a third embodiment of the swivel joint of the present invention.

On example of a monitoring means for the first primary seal 102 is shown in FIG. 7. In this embodiment, the monitoring means includes a monitor port 122 which extends through the female race portion 22 to a portion of the annulus 40 located between the first and second primary seals 102, 104. Curing normal operation of the swivel joint 100, the monitor port 120 is sealed by a removable plug 124. During pressure testing of the first primary seal 102, the plug 124 is removed and the flow bore 38 is pressurized up to a predetermined pressure. If the first primary seal 102 cannot hold this pressure, which is an indication that the first primary seal has faded, the swivel joint 100 can be taken out of service and the first primary seal replaced. The swivel joint 100 can thus be repaired prior to the second primary seal 104 failing, which as discussed above could cause irreversible damage to the male nose portion 28 and/or the female inner end portion 34 that would render the swivel joint unsuitable for further service. When the swivel joint 100 is in normal service, the plug 124 may be removed during periodic inspections to determine if (racking fluid has leaked past the first primary seal 102 and into the monitor port 122. If so, the swivel joint 100 can be used until a predetermined life cycle of the second primary seal 104 has expired, or the swivel joint can taken out of service and the first primary seal 102 replaced prior to a failure of the second primary seal.

Figure 8:
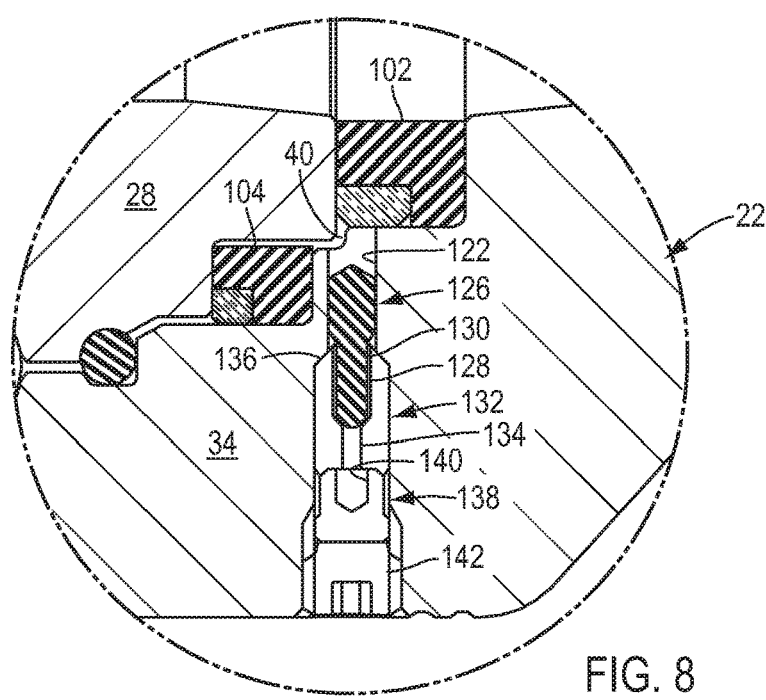
FIG. 8 is an enlarged cross sectional view of the male and female race portions of a fourth embodiment of the swivel joint of the present invention.

Another embodiment of a monitoring means for the first primary seal 102 is shown in FIG. 8. Similar to the embodiment just described, the monitoring means of the present embodiment includes a monitor port 122 which extends through the female race portion 22 to a portion of the annulus 40 located between the first and second primary seals 102, 104. A plug 126 is positioned in the monitor port 122 in communication with the annulus 40. The plug 126 includes a stem portion 128 which is received in an axial recess 130 in the radially inner end of a plug holder 132. The plug holder 132 includes an axial through bore 134 which is connected to the recess 130 and an annular shoulder 136 on its radially inner end which ideally forms a metal-to-metal seal with a corresponding annular seat in the monitor port 122. A keeper 138 is positioned in the monitor port 122 radially outwardly of the plug holder 132. The keeper 138 comprises a cavity 140 in its radially inner end which is aligned with the through bore 134 in the plug holder 132. The radially inner end of the keeper 138 preferably forms a metal-to-metal seal with the radially outer end of the plug holder 132 which, together with the metal-to-metal seal between the monitor port 122 and the annular shoulder 136 on the plug holder, is sufficient to contain any pressure that should leak past the first primary seal 102. A retainer 142 is secured in the monitor port 122 radially outwardly of the keeper 138 to thereby retain the plug 126, the plug holder 132 and the keeper in position in the monitor port. The retainer 142 may be secured to the monitor port 122 with, e.g., slotted threads to prevent pressure from being trapped between the retainer and the keeper 138.

In this embodiment of the monitoring means, the plug 126 is formed of a relatively soft but preferably resilient material, such as rubber. Consequently, in the event of a failure of the first primary seal 102, pressure in the annulus 40 will enter the monitor port 122 and force the plug 126 to extrude through the through bore 134 in the plug holder 132 and into the cavity 140 of the keeper 138. Thus, one can determine whether the first primary seal 102 has developed a leak by removing the retainer 142 and the keeper 138 and seeing whether a portion of the plug 128 has extruded past the plug holder 132. If so, the swivel joint 100 can be removed from service and the first primary seal 102 removed and replaced before a leak develops in the second primary seal 104.

In combination with the second primary seal 104, therefore, the monitoring means can be used to extend the useful life of the swivel joint 100. By using the monitoring means to check the sealing integrity of the first primary seal 102 on a regular basis, a failure of the first primary seal can be detected prior to a failure of the second primary seal 104. As in the case of a prior art swivel joint with a single primary seal, a failure of both the first and second primary seals 102, 104 could result in erosion of the ale nose portion 28 and the female inner end portion 34 and/or a failure of the male and female race portions 18, 22, either of which would require the swivel joint to be replaced. Thus, the useful life of the swivel joint can be extended by simply replacing the first primary seal 102 once it has been found to have failed and before the second primary seal 104 fails.

It should be recognized that, while the present invention has been described in relation to the preferred embodiments thereof, those skilled in the art may develop a wide variation of structural and operational details without departing from the principles of the invention. For example, the various elements shown in the different embodiments may be combined in a manner not illustrated above. Therefore, the appended claims are to be construed to cover all equivalents falling within the true scope and spirit of the invention.

What is claimed is:

1. A swivel joint comprising:
a tubular female member which includes a female race portion having an axially extending inner annular recess, a female inner end portion which is formed at an axially inner end of the recess, and a number of inner annular grooves which are formed in the recess coaxially therewith;
a tubular male member which includes a male race portion having an annular outer surface which is configured to be received in the recess, a male nose portion which is formed at an end of the male race portion, and a number of outer annular grooves which are formed on the outer surface coaxially therewith;
wherein the male race portion is positioned in the female race portion such that the male nose portion is located adjacent the female inner end portion and each outer groove is aligned with a corresponding inner groove to thereby define a number of annular bearing races within which a plurality of balls are received to thereby rotatably connect the male member to the female member;
a first primary seal which is positioned between the male nose portion and the female inner end portion; and
a second primary seal which is positioned between the male nose portion and the female inner end portion radially outwardly of the first primary seal;
wherein the male and female members define a flow bore through the swivel joint which is sealed by the first primary seal and, in the event of a failure of the first primary seal, the second primary seal;
wherein the male nose portion comprises an end wall which extends radially outwardly from the flow bore and a cylindrical side wall which extends axially outwardly from the end wall, and wherein the first primary seal sealing engages the end wall and the second primary seal sealingly engages the cylindrical side wall; and
wherein the second primary seal is mounted in an annular seal pocket which is formed in the female inner end portion, said seal pocket comprising a floor and first and second radially outwardly extending side walls between which the second primary seal is positioned.

2. The swivel joint of claim 1, wherein the second primary seal comprises in cross section a generally rectangular base portion which is positioned at least partially in the seal pocket and an annular ridge portion which extends radially inwardly from the base portion and sealingly engages the male nose portion.

3. The swivel joint of claim 2, wherein the annular ridge portion comprises in cross section a radially inner peak and a beveled portion which diverges radially outwardly from the peak in a direction toward an axially outer end of the recess.

4. The swivel joint of claim 3, wherein the beveled portion sealingly engages a conical sealing surface which is formed on the male nose portion opposite the seal pocket.

5. The swivel joint of claim 4, wherein the peak sealingly engages a cylindrical sealing surface which is formed on the male nose portion axially inwardly of the conical sealing surface.

6. The swivel joint of claim 3, wherein the second primary seal comprises an annular non-extrusion spring which is located proximate an intersection of the base portion and the beveled portion.

7. The swivel joint of claim 1, wherein the male nose portion further comprises a conical side wall which diverges radially outwardly from the cylindrical side wall in a direction toward the axially outer end of the recess, and wherein the second primary seal sealingly engages both the cylindrical side wall and the conical side wall.

8. The swivel joint of claim 7, wherein the second primary seal comprises in cross section a radially inner peak and a beveled portion which diverges radially outwardly from the peak in a direction toward an axially outer end of the recess, and wherein the annular peak sealingly engages the cylindrical side wall and the beveled portion sealingly engages the conical side wall.

9. A swivel joint comprising:
   a tubular female member which includes a female race portion having an axially extending inner annular recess, a female inner end portion which is formed at an axially inner end of the recess, and a number of inner annular grooves which are formed in the recess coaxially therewith;
   a tubular male member which includes a male race portion having an annular outer surface which is configured to be received in the recess, a male nose portion which is formed at an end of the male race portion, and a number of outer annular grooves which are formed on the outer surface coaxially therewith;
   wherein the male race portion is positioned in the female race portion such that the male nose portion is located adjacent the female inner end portion and each outer groove is aligned with a corresponding inner groove to thereby define a number of annular bearing races within which a plurality of balls are received to thereby rotatably connect the male member to the female member;
   a first primary seal which is positioned between the male nose portion and the female inner end portion; and
   a second primary seal which is positioned between the male nose portion and the female inner end portion radially outwardly of the first primary seal;
   wherein the male and female members define a flow bore through the swivel joint which is sealed by the first primary seal and, in the event of a failure of the first primary seal, the second primary seal;
   wherein the second primary seal is mounted in an annular seal pocket which is formed in the female inner end portion, said seal pocket comprising a floor and first and second radially outwardly extending side walls between which the second primary seal is positioned; and
   wherein the second primary seal comprises a generally rectangular cross section having a first axially outer sealing face which sealingly engages a radially extending first end wall on the male nose portion.

10. The swivel joint of claim 9, wherein the first primary seal is mounted in an annular seal pocket which is formed in the female inner end portion, and wherein the first primary seal comprises a generally rectangular cross section having a second axially outer sealing face which sealingly engages a radially extending second end wall that is formed on the male nose portion radially and axially inwardly of the first end wall.

11. The swivel joint of claim 10, wherein the second end wall extends radially outwardly from the flow bore.

12. The swivel joint of claim 11, wherein the second end wall is connected to the first end wall by an axially extending cylindrical side wall.

13. A swivel joint comprising:
   a tubular female member which includes a female race portion having an axially extending inner annular recess, a female inner end portion which is formed at an axially inner end of the recess, and a number of inner annular grooves which are formed in the recess coaxially therewith;
   a tubular male member which includes a male race portion having an annular outer surface which is configured to be received in the recess, a male nose portion which is formed at an end of the male race portion, and a number of outer annular grooves which are formed on the outer surface coaxially therewith;
   wherein the male race portion is positioned in the female race portion such that the male nose portion is located adjacent the female inner end portion and each outer groove is aligned with a corresponding inner groove to thereby define a number of annular bearing races within which a plurality of balls are received to thereby rotatably connect the male member to the female member;
   a first primary seal which is positioned between the male nose portion and the female inner end portion;
   a second primary seal which is positioned between the male nose portion and the female inner end portion radially outwardly of the first primary seal;
   an annulus which is formed between the female inner end portion and the male nose portion and is connected to the flow bore; and
   a monitor port which extends from a radial outer surface of the female member to the annulus;
   wherein the male and female members define a flow bore through the swivel joint which is sealed by the first primary seal and, in the event of a failure of the first primary seal, the second primary seal;
   wherein the annulus comprises a first portion which extends between the first and second primary seals;
   wherein the monitor port extends through the female member to the first portion of the annulus and is sealed by a removable plug member; and
   wherein a failure of the first primary seal can be detected by removing the plug member and determining whether fluid from the flow bore has entered the monitor port.

14. The swivel joint of claim 13, wherein the annulus comprises a second portion which extends between the second primary seal and an axially innermost bearing race and the swivel joint further comprises:
   a leak detection port which extends through the female member to the second portion of the annulus;
   wherein a failure of both the first and second primary seals can be detected by observing whether fluid from the flow bore has escaped through the leak detection port.

15. The swivel joint of claim 13, further comprising:
   a plug holder which is positioned in the monitor port radially outwardly of the plug member, the plug holder comprising an axial through bore;
   wherein the plug member is configured such that, in the event of a failure of the first primary seal, pressure in the first portion of the annulus will force at least a portion of the plug member through the axial through bore to thereby provide a visual indication that the first primary seal has failed.

16. The swivel joint of claim 15, further comprising a retainer which is secured in the monitor port radially outwardly of the plug holder to thereby secure the plug holder in the monitor port.

17. The swivel joint of claim 16, further comprising a keeper which is positioned in the monitor port between the plug holder and the retainer, the keeper comprising a cavity on its radially inner end which is aligned with the through bore and into which the portion of the plug member will extrude in the event of a failure of the first primary seal.

18. The swivel joint of claim 17, wherein an annular portion of the plug holder surrounding the through bore is sealed to the monitor port and a radially inner end of the keeper is sealed to a radially outer end of the plug holder over the through bore to thereby retain the pressure in the monitor port.

* * * * *